United States Patent [19]

Carlson et al.

[11] Patent Number: 4,957,975

[45] Date of Patent: Sep. 18, 1990

[54] FLUOROELASTOMER COMPOSITION WITH LOW TENDENCY TO FOUL MOLDS

[75] Inventors: Dana P. Carlson, Chadds Ford, Pa.; Walter W. Schmiegel, Wilmington, Del.

[73] Assignee: E. I. Du Pont de Nemours and Company, Wilmington, Del.

[21] Appl. No.: 167,868

[22] Filed: Mar. 14, 1988

[51] Int. Cl.$^5$ ............................................. C08F 8/00
[52] U.S. Cl. ................................ 525/340; 525/326.2; 525/326.3; 525/351; 525/359.1; 525/368; 525/369
[58] Field of Search ...................... 525/340, 351, 359.1, 525/368, 369

[56] References Cited

U.S. PATENT DOCUMENTS

| | | | |
|---|---|---|---|
| 3,655,727 | 4/1972 | Patel et al. | 260/470 P |
| 3,752,787 | 8/1973 | de Brunner | 260/41 B |
| 3,809,672 | 5/1974 | Stivers | 260/42.27 |
| 3,884,877 | 5/1975 | Kolb | 260/47 |
| 3,988,502 | 10/1976 | Patel et al. | 526/18 |
| 4,496,682 | 1/1985 | Schmiegel | 524/545 |

FOREIGN PATENT DOCUMENTS 1356344  1/1974  United Kingdom .

Primary Examiner—Bernard Lipman

[57] ABSTRACT

A composition that exhibits low tendency to foul mold cavities comprising a fluoroelastomer of vinylidene fluoride units and units of at least one other fluorine-containing monomer copolymerizable with vinylidene fluoride; a bisphenol or a polyhydroxy phenol crosslinking agent of the formula

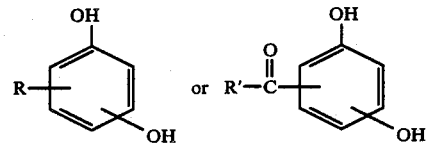

where R is H, alkyl or aryl and R' is alkyl or aryl; a divalent metal oxide or hydroxide; and 0.2–4 parts by weight per 100 parts by weight fluoroelastomer of a crosslinking accelerator which is a quaternary ammonium salt of the formula R"$_4$N$^+$X$^-$ wherein each R" is independently an alkyl group of 2–10 carbon atoms or an aralkyl group of 7–10 carbon atoms and X$^-$ is selected from the group consisting of fluoride, dihydrogen phosphate, periodate, acetate, hydrogen sulfate, methane sulfonate, toluene sulfonate, or an anion of a bisphenol or a polyhydroxy phenol.

14 Claims, No Drawings

FLUOROELASTOMER COMPOSITION WITH LOW TENDENCY TO FOUL MOLDS

BACKGROUND OF THE INVENTION

This invention relates to novel vinylidene fluoride-based fluoroelastomer compositions that exhibit little tendency to foul molds, i.e., minor or no mold deposits are formed after repeated moldings in the same mold cavities.

Fluoroelastomers may be cured with combinations of polyhydroxy compounds, typically difunctional phenol compounds, as the crosslinking agent and quaternary phosphonium or tetraalkyl ammonium salts as accelerators, as is described in U.S. Pat. No. 3,655,727 to Patel and in U.S. Pat. No. 4,496,682 to Schmiegel. The chloride and bromide salts of the phosphonium or ammonium accelerators are most commonly used and the fluoroelastomer compositions usually include metal hydroxides and metal oxides as acid acceptors for the curing formulation. However, the manufacture of molded products from these compositions presents a serious problem because, in spite of the fact that mold release agents are sprayed into the mold cavity to coat the mold cavity surface or release agents are incorporated in the polymer, the vulcanizates tend to adhere to the walls of the mold cavity. After only a few mold cycles heavy black deposits are formed on the walls of the mold. These deposits can have a serious adverse effect on the quality of the molded articles so that reject losses and major downtime incurred for mold cleanup add materially to the cost of manufacture of the fluoroelastomer article. Thus, there is a need in the fluoroelastomer art for compositions that can be molded repeatedly, in the same cavity, without the formation of dirtied or fouled mold surfaces.

SUMMARY OF THE INVENTION

The present invention is directed to a fluoroelastomer composition that exhibits low tendency to foul mold cavities which comprises:

(a) a fluoroelastomer comprising vinylidene fluoride units and units of at least one other fluorine-containing monomer copolymerizable with vinylidene fluoride, said monomer containing 2-7 carbon and containing at least as many fluorine atoms as carbon atoms;

(b) a crosslinking agent selected from the group consisting of a bisphenol or a polyhydroxy phenol of the formula

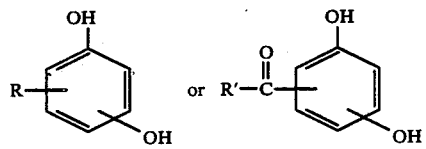

where R is hydrogen, alkyl or aryl and R' is alkyl or aryl;

(c) a divalent metal oxide or hydroxide as an acid acceptor;

(d) 0.2-4 parts by weight per 100 parts by weight of fluoroelastomer of a crosslinking accelerator which is a quaternary ammonium salt of the formula $R''_4N^+X^-$ wherein each R" is independently an alkyl group of 2-10 carbon atoms or an aralkyl group of 7-10 carbon atoms and $X^-$ is selected from the group consisting of fluoride, dihydrogen phosphate, periodate, acetate, hydrogen sulfate, methane sulfonate, toluene sulfonate, or an anion of a bisphenol or a polyhydroxy phenol of (b) above.

DETAILED DESCRIPTION OF THE INVENTION

The vinylidene fluoride copolymers that are cured with the vulcanization system of this invention contain as a crosslinking accelerator a quaternary ammonium salt of the formula $R''_4N^+X^-$ where R" in each instance is independently an alkyl group of 2-10 carbon atoms or an aralkyl group of 7-10 carbon atoms, preferably an alkyl group of 2-4 carbon atoms, most preferably 4 carbon atoms, and $X^-$ is selected from the group consisting of fluoride, dihydrogen phosphate, periodate, acetate, hydrogen sulfate, methane sulfonate, toluene sulfonate, or an anion of a bisphenol or a polyhydroxy phenol of (b) described herein above. The quaternary ammonium salts wherein the anion is that of a bisphenol or a polyhydroxy phenol are readily prepared by the rapid reaction of a tetraalkylammonium hydroxide and at least an equimolar amount of the aromatic hydroxy compound in an inert solvent, such as methanol, which is subsequently removed. The alkyl or aralkyl groups can be symmetrical or asymmetrical. Most preferably, each R" is an alkyl group that contains 4 carbon atoms, i.e., n-butyl. It has been discovered that when a tetraalkylammonium salt of this invention and a bisphenol or a polyhydroxy phenol are used in the curing formulation for the vinylidene fluoride-based fluoroelastomers, the mold cavity in which the fluoroelastomer is cured does not contain amounts of black deposit that most frequently form on the mold cavities during the curing process. When this build-up of black deposit occurs the quality of the molded articles is unsatisfactory and the molding process must be interrupted until the deposit is removed from the mold cavity.

As added advantages of the fluoroelastomer composition of the present invention, it has been found that the fluoroelastomer has a significantly lower compound viscosity making the fluoroelastomer easier to process and further, the cured fluoroelastomer has excellent compression set resistance.

Usually, the quaternary ammonium salts that function as crosslinking accelerators used in this invention are incorporated in the fluoroelastomer in amounts of about 0.2-4 parts by weight per 100 parts fluoroelastomer, preferably 0.4-2 parts.

The vinylidene fluoride copolymers useful in this invention with the novel curing system contain, in addition to vinylidene fluoride, one or more fluorine-containing monomers copolymerizable with vinylidene fluoride, said monomer containing 2-7 carbon atoms and contains at least as many fluorine atoms as carbon atoms.

The fluoroelastomers used in this invention are copolymers of vinylidene fluoride with hexafluoropropylene, chlorotrifluoroethylene, 1-hydropentafluoropropylene, or 2-hydropentafluoropropylene and copolymers of vinylidene fluoride, tetrafluoroethylene and hexafluoropropylene or 1-hydro- or 2-hydropentafluoropropylene. "Copolymer" herein means the product of copolymerizing two or more monomers. Especially preferred are vinylidene fluoride/hexafluoropropylene copolymers in which the monomers are combined in a molar ratio of about 88:12 to 50:50, and vinylidene fluoride terpolymers of the type disclosed in 2,968,649 to Pailthorp et al. The fluoroelastomer can also be any other vinylidene fluoride copolymer which can be cured to useful products, for example copolymers of vinylidene fluoride and hexafluoropropylene or pentafluoropropylene or linear perfluoro alpha olefins with dichlorodifluoroethylene, chlorofluoroethylene, chlorotrifluoroethylene, bromotetrafluorobutene, bromotrifluoroethylene (Polymers of this type are shown in Apotheker et al. U.S. Pat. No. 4,214,060 and U.S. Pat. No. 4,035,565), with fluorinated vinyl esters, with derivatives of perfluoroacrylic acid, and with fluorinated alkyl vinyl ethers; the latter can be illustrated by copolymers of vinylidene fluoride, hexafluoropropylene and a perfluoroalky alkyl perfluorovinyl ether.

Useful copolymers of vinylidene fluoride and 1,2,3,3,3-pentafluoropropylene are described in U.S. Pat No. 3,331,823 and copolymers of these two components with tetrafluoroethylene are described in U.S. Pat. No. 3,335,106. The "other fluorinated monomer" of such an elastomeric copolymer is preferably an ethylenically unsaturated monomer containing at least as many fluorine atoms as carbon atoms.

An acid acceptor that is a divalent metal oxide or hydroxide is incorporated in the fluoroelastomer composition. Representative divalent metal oxides include calcium oxide, barium oxide, magnesium oxide, zinc oxide, lead oxide or divalent metal hydroxides of calcium or barium. The amount of metal compound added generally is about 1-15 parts by weight per 100 parts fluoroelastomer, preferably about 2-10 parts.

The acid acceptor not only absorbs certain gaseous and acidic materials which are evolved during curing and can chemically attack and weaken the fluoroelastomer but, also, they have important functions in controlling the rate of crosslinking and final properties.

The curing system used with the fluoroelastomers must contain, in addition to the quaternary ammonium salt disclosed herein, certain crosslinking agents that are either bisphenols or polyhydroxy phenols described herein. It is the combination of these components that results in a vinylidene fluoride-based fluoroelastomer that can be repeatedly molded in a mold cavity without the formation of excessive amounts of residue on the surface of the mold cavity.

The crosslinking agent used in the fluoroelastomer compositions are bisphenols usually having the formula:

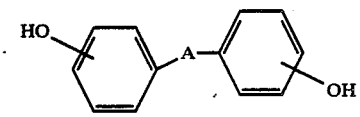

where A is a stable divalent radical such as

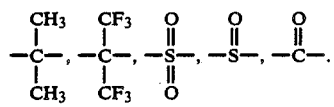

Representative bisphenols include 4,4'-hexafluoroisopropylidene diphenol, 4,4'-isopropylidene diphenol, and 4,4'-dihydroxydiphenyl sulfone. The crosslinking agent can be a polyhydroxy phenol of the formula:

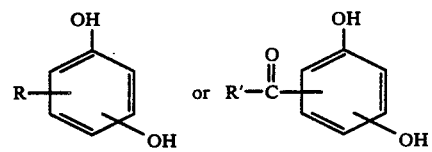

where R is H or an alkyl group having 1-4 carbon atoms or an aryl group containing 6-10 carbon atoms and R' is an alkyl group containing 1-4 carbon atoms or an aryl group containing 6-10 carbon atoms. Blends of two or more crosslinking agents can be used in the present invention.

Preferred bisphenols and polyhydroxy phenol crosslinking agents include 4,4'-hexafluoroisopropylidene diphenol; 4,4'-dihydroxydiphenyl sulfone; 4,4'-dihydroxy benzophenone, 2,4-dihydroxybenzophenone, resorcinol and hydroquinone.

The crosslinking agent can be added to the ingredients in amounts of from about 0.1-5 parts per 100 parts fluoroelastomer, preferably 0.6-2.5 parts.

Fillers are often added to the fluoroelastomers described above to improve their molding characteristics and other properties. When a filler is employed it is added to the vulcanization recipe in amounts of up to about 100 parts, preferably between about 15 and about 50 parts per 100 parts fluoroelastomer. Representative fillers which may be used in this invention are reinforcing thermal grade carbon blacks or non-black pigments of relatively low reinforcement characteristics such as clays, barytes, etc. Conventional plasticizers, softeners and processing aids, preferably esters or ketones commonly used with elastomers, may also be added to the fluoroelastomers if desired.

When the selected quaternary ammonium salts of this invention are used in combination with the particular crosslinking agents, fluoroelastomer compositions are obtained that can be molded repeatedly in the same cavity without large amounts of polymer deposits forming on the walls of the cavity.

Measurement of Mold Fouling

In order to evaluate the tendency for various fluoroelastomer compositions to build up deposits in mold cavities after repeated moldings the following procedure was used. A 19.0 cm.×19.0 cm.×3.18 cm. bottom plate with nine disc-shaped cavities, 2.86 cm. (1.125 in.) in diameter and 0.19 cm. (0.075 in.) deep and surrounded by an overflow runner system was prepared from SAE 1141 steel and was then hardened to a Rockwell Hardness of 15-20. The cavities were numbered and used as machined, without further surface treatment. A matching flat top plate was provided. Prior to testing a new compound, each cavity was thoroughly cleaned with a Bright Boy® mold cleaning stick, blown free of dust with dry, oil-free air and then rinsed with a 50 vol. % mixture of 1,1,2-trichloro-2,2,1-trifluoroethane (FREON®-113) and acetone and air dried.

Test compounds were sheeted out on a mill to an approximate thickness of 0.25 cm. and then 2.5 cm. diameter disks were cut out to fit the mold cavities. Specimens were then cured for 10 min. at 177° C. under a mold pressure of 4 MPa. After each mold cycle the cured specimen was removed carefully and replaced with a fresh uncured disk and the procedure continued repeatedly until there were a total of fifty complete cycles.

At least one mold cavity was unused and served as a reference point for determining the amount of deposits. Stocks containing the common crosslinking accelerator benzyltriphenylphosphonium chloride begin showing mold fouling almost from the very first mold cycle and deposits continue to build up until, after 50 cycles, the mold cavity is covered by a heavy, black deposit. These stocks are listed as giving "heavy" deposits. Stocks containing the non-fouling accelerators of this invention will show little ("trace") or no ("none") deposits after fifty cycles.

The following examples further illustrate the invention. All amounts shown are by weight unless otherwise indicated. Tetra-n-butylammonium is referred to simply as tetrabutylammonium throughout.

EXAMPLE 1

A fluoroelastomer composition of the present invention is prepared, cured and tested for physical properties and mold fouling. The composition is obtained by blending the following on a 2-roll rubber mill whose rolls are at about 25° C: 100 parts of a copolymer of vinylidene fluoride and hexafluoropropylene (60/40 wt. ratio, Mooney viscosity ML-10 at 100° C., of 65), 30 parts of carbon black, 4.5 parts of the acid acceptor calcium hydroxide, 3.0 parts of the acid acceptor magnesium oxide, 2.0 parts of the crosslinking agent 4,4'-hexafluoroisopropylidene diphenol, and 0.6 parts of the crosslinking accelerator tetrabutylammonium hydrogen sulfate.

Test specimens were prepared and Mooney scorch determined at 121° C. for 30 min. according to ASTM D-1646. Curing characteristics were determined with the oscillating disc cure meter according to ASTM Method D-2048. The cure state achieved in 30 min. at 177° C. is measured by MH-ML in N.m, where $M_H$ is the highest torque reached and $M_L$ is the minimum torque. The time in minutes required to reach 90% of total cure is given by $t_c 90$ and the relative rate of cure can be approximated by the quantity $t_c 90 - t_s 0.2$ in minutes, where $t_s 0.2$ is the time required for the torque to increase by 0.2 N.m.

Samples for testing are first press-cured at 177° C. for 10 min. at a mold pressure of 4 MPa and are then post-cured for 24 hours at 232° C. in a circulating air oven. After postcuring the samples are subjected to heat aging by exposure to circulating air for 70 hours at 275° C. in an oven. The modulus at 100% elongation, tensile strength and elongation at break values for press-cured, post-cured or heat-aged samples are obtained at room temperature by ASTM Method D-412. Compression set values on post-cured O-rings are obtained by ASTM Method D-395-61.

Test results are shown below in Table I. The mold fouling test is carried out as described hereinabove. After 50 curing cycles there are no deposits of cured elastomer on the surface of the mold.

EXAMPLE 2

The procedure described above in Example 1 was repeated except that 1.8 parts of 4,4'-hexafluoroisopropylidene diphenol and 0.41 parts of tetrabutylammonium hydrogen sulfate are used. Data are given in Table 1 and show that after 50 molding cycles there are no deposits on the surfaces of the test mold.

COMPARATIVE EXAMPLE 1

The procedure described above in Example 1 was repeated except that 0.60 parts of benzyltriphenylphosphonium chloride is used as the crosslinking accelerator rather than tetrabutylammonium hydrogen sulfate. The data are given in Table 1, and show that the Mooney viscosity of the fluoroelastomer is higher than when a crosslinking accelerator of this invention is used, and that moderately heavy deposits are formed on the mold cavity wall.

EXAMPLES 3 AND 4

The procedure described above in Example 1 was repeated except the fluoroelastomer is a copolymer of vinylidene fluoride, hexafluoropropylene and tetrafluoroethylene (wt. ratio 45/30/25, Mooney viscosity, ML-10 at 121° C., of 70). Polymer black, calcium hydroxide, magnesium oxide and bisphenol are used in the amounts shown in Table 2, and as an accelerator, tetrabutylammonium hydrogen sulfate is present at 1.00 parts in Example 3 and at 0.67 parts in Example 4. Test data show tetrabutylammonium hydrogen sulfate to be a very effective crosslinking accelerator in combination with 4,4'-hexafluoroisopropylidene diphenol in promoting cure and demonstrate that when it is used no mold deposits are formed on the mold cavity wall after fifty molding cycles in the same mold cavity.

EXAMPLE 5

The procedure described above in Example 1 was repeated except the fluoroelastomer was a copolymer of vinylidene fluoride, hexafluoropropylene and tetrafluoroethylene (wt. ratio 35/35/30, Mooney viscosity, ML-10 at 121° C., of 60) that was compounded with additives and diphenol curative, in the amounts shown in Table 2. Tetrabutylammonium hydrogen sulfate, 0.86 parts, is used as the accelerator. No mold deposits formed on the mold cavity wall after fifty molding cycles.

COMPARATIVE EXAMPLE 2

For comparative purposes a fluoroelastomer composition outside of the present invention is prepared, cured and tested for physical properties and mold adhesion. The composition is obtained by blending the following on a 2-roll rubber mill whose rolls are at about 25° C.: 100 parts of fluoroelastomer used in Example 3, 30 parts of carbon black, 4.5 parts of calcium hydroxide, 3.0 parts of magnesium oxide, 1.9 parts of 4,4'-hexafluoroisopropylidene diphenol, and 1.00 parts of benzyltriphenylphosphonium chloride.

The composition was cured and tested as in Example 1 and test results are shown in Table 2. This compounded stock has a high Mooney viscosity, which would imply poor processability, and mold deposits of cured elastomer were heavy after fifty repeated moldings on the same surface.

COMPARATIVE EXAMPLE 3

For comparative purposes another fluoroelastomer composition outside of the present invention is prepared by blending 100 parts of the fluoroelastomer of Example 5, 30 parts of carbon black, 4.5 parts of calcium hydroxide, 3.0 parts of magnesium oxide, 2.3 parts of 4,4'-hexafluoroisopropylidene diphenol, and 1.03 parts of the accelerator benzyltriphenylphosphonium chloride.

This compounded stock has a high Mooney viscosity and is slow curing, as judged by the value of $t_c90-t_c0.2$. It is cured and tested as in Example 1, with the results shown in Table 2. There were heavy mold deposits of cured elastomer after fifty repeated moldings on the same surface.

EXAMPLE 6

The procedure described above in Example 1 was repeated with ingredients and additives in the amount shown in Table 3. The crosslinking accelerator was 0.62 parts tetrabutylammonium fluoride trihydrate. The mold fouling test was conducted as described above. The data show that this composition has a low compound viscosity, has a fast cure, good physical strength and low compression set. No mold fouling occurs on the mold cavity wall after repeated moldings in the same mold cavity.

COMPARATIVE EXAMPLE 4

For comparative purposes a fluoroelastomer composition outside of the present invention is prepared, cured and tested for physical properties and mold adhesion by procedures described in Example 1. The fluoroelastomer is a vinylidene fluoride, hexafluoropropylene, tetrafluoroethylene copolymer with polymerized monomer units present in the weight ratio 45:30:25 and has a Mooney viscosity (ML-10 at 121° C.) of 70. The composition is prepared by blending the following on a 2-roll rubber mill whose rolls are at about 25° C.: 100 parts of fluoroelastomer, 30 parts of carbon black, 4.5 parts of calcium hydroxide, 3.0 parts of magnesium oxide, 1.9 parts of 4,4'-hexafluoroisopropylidene diphenol, and 0.65 parts of tetrabutylammonium iodide.

Test results are shown in Table 3. This compounded stock has a high Mooney viscosity, which would imply poor processability, and deposits of cured elastomer were heavy on the mold surface after fifty repeated moldings on the same surface. When the tetrabutylammonium compound contains iodine instead of one of the anions of this invention extensive mold fouling occurs.

COMPARATIVE EXAMPLE 5

The procedure described in Example 6 was repeated except tetrabutylammonium bromide was used as a crosslinking accelerator in the amount shown in Table 3. The test data shown that when the tetrabutylammonium compound contains bromine instead of one of the anions of this invention, the compound viscosity is high and heavy elastomer deposits are formed on the mold surface after repeated molding operations carried out in the same mold cavity.

COMPARATIVE EXAMPLE 6

In a procedure exactly equivalent to that of Example 6, tetrabutylammonium chloride was used as a cure accelerator in the amount shown in Table 3. The test data show that when the tetrabutylammonium compound contains chlorine instead of one of the anions of this invention, the compound viscosity is high and heavy elastomer deposits are formed after repeated molding operations carried out in the same mold cavity.

EXAMPLES 7-9

The procedure described above in Example 1 was repeated except that the fluoroelastomer consisted of vinylidene fluoride, hexafluoropropylene and trifluoroethylene in a weight ratio of 45:30:25, and had a Mooney viscosity of (ML-10 at 121° C.) of 70. The crosslinking accelerators used with the fluoroelastomer were tetraethylammonium hydrogen sulfate (example 7), tetrabutylammonium hydrogen sulfate (example 8), and tetrabutylammonium dihydrogen phosphate (example 9) with the ingredients and in the amounts given in Table 4. The crosslinking accelerators used in these examples result in a low viscosity fluoroelastomer. The mold fouling test described above was repeated. After fifty repeated mold cycles the wall of the mold cavity did not contain elastomer deposits on its surface.

EXAMPLES 10-13

The procedure described above in Example 1 was repeated except the tetrabutylammonium salts contained the anions, acetate, methane sulfonate, toluene sulfonate and periodate in equimolar amounts as shown in Table 5. The fluoroelastomer used was that described in Example 3,(vinylidene fluoride, hexafluoropropylene, tetrafluoroethylene, 45/30/25 wt ratio) and each example contained, per 100 parts of elastomer, 30 parts MT black, 1.9 parts 4,4'-hexafluoroisopropylidene diphenol, 3.0 parts magnesium oxide and 4.5 parts calcium hydroxide. After testing as previously described in Example 1, there are no mold deposits after fifty curing cycles.

EXAMPLES 14-20

The procedure described above in Example 1 was repeated with the three fluoroelastomers described in Table 6 using tetrabutylammonium hydrogen sulfate as the crosslinking accelerator and, as crosslinking agent, hydroquinone, methylhydroquinone, 2,4-dihydroxyhydroquinone or 4,4'-isopropylidene diphenol, in the combinations shown in Table 6. Using the tests described in Example 1, the data show that when this crosslinking accelerator is used with the crosslinking agents, mold deposits are formed only in trace amounts or not at all after fifty repeated moldings in the same cavity.

EXAMPLE 21

To a stirred solution of 100 g (0.31 mole) of the bisphenol crosslinking agent 4,4'-hexafluoroisopropylidene diphenol in 1 L of methanol is added 100 mL of methanol containing 25.9 g (0.1 mole) tetrabutylammonium hydroxide. After removal of methanol at 50°-60° C. on a rotary evaporator, 124 g of a violet-colored solid is obtained in which one third of the 4,4'-hexafluoroisopropylidene diphenol is present as a tetrabutylammonium salt.

A fluoroelastomer composition of the present invention is prepared by blending the following on a 2-roll rubber mill whose rolls are at about 25° C.: 100 parts of fluoroelastomer, 30 parts of carbon black, 6 parts of calcium hydroxide, 3 parts of magnesium oxide and 2.5 parts of the mixture prepared above containing the tetrabutyl ammonium salt of 4,4'-hexafluoroisopropylidene diphenol. The fluoroelastomer is a vinylidene fluoride, hexafluoropropylene, tetrafluoroethylene copolymer with polymerized monomer units present in the weight ratio 45:30:25, and has a Mooney viscosity (ML-10 at 121° C.) of 70.

The composition was cured and tested as described in Example 1. The compound Mooney viscosity is, 60, lower than in Comparative Example 2, compression set is 17% after 70 hours at 200° C. and there was no mold residue after fifty curing cycles in the same cavity.

TABLE 1

|  | Example 1 | Example 2 | Comparative Example 1 |
|---|---|---|---|
| Composition vinylidene fluoride/hexafluoropropylene 60/40 wt. ratio | 100 | 100 | 100 |
| Carbon black, MT | 30 | 30 | 30 |
| Calcium hydroxide | 4.5 | 4.5 | 4.5 |
| Magnesium oxide | 3 | 3 | 3 |
| 4,4'-hexfluoroisopropylidene diphenol | 2.0 | 1.8 | 2.0 |
| Tetrabutylammonium hydrogen sulfate | 0.60 | 0.41 | — |
| Benzyltriphenylphosphonium chloride | — | — | 0.60 |
| Mooney Scorch (121° C./30 min.) | | | |
| minimum (Mooney units) | 31 | 28 | 34 |
| time to 10 point rise, min | >30 | >30 | >30 |
| Oscillating Disk Rheometer | | | |
| ASTM D-2084, $M_H-M_L$, N · m | 5.4 | 4.8 | 5.1 |
| $t_s$ 0.2, min | 2.6 | 3.0 | 3.1 |
| $t_c$ 90, min | 3.7 | 4.4 | 4.8 |
| Press Cured Samples (177° C./10') | | | |
| Modulus - 100%, MPa | 5.1 | 4.0 | 4.1 |
| Tensile Strength, MPa | 11.1 | 10.5 | 9.4 |
| Elongation at break, % | 220 | 250 | 225 |
| Post Cured Samples (232° C./24 h) | | | |
| Modulus - 100%, MPa | 7.5 | 5.5 | 5.8 |
| Tensile Strength, MPa | 12.5 | 11.4 | 13.4 |
| Elongation at break, % | 145 | 170 | 185 |
| Heat Aged Samples (275° C./70 h air) | | | |
| Modulus - 100%, MPa | 6.5 | 3.8 | 4.4 |
| Tensile Strength, MPa | 11.1 | 10.1 | 10.2 |
| Elongation at break, % | 160 | 220 | 190 |
| Compression set, %; ASTM D-395-61, method B 70 h/200° C. | 23 | 19 | 17 |
| Deposits in mold after 50 Cycles | none | none | mod. heavy |

TABLE 2

| Example | Example 3 | Example 4 | Example 5 | Comp. Example 2 | Comp. Example 3 |
|---|---|---|---|---|---|
| Composition | | | | | |
| Elastomer | | | | | |
| vinylidene fluoride/hexafluoropropylene/ tetrafluoroethylene, 45/30/25 wt. ratio | 100 | 100 | — | 100 | — |
| vinylidene fluoride/hexafluoropropylene/ tetrafluoroethylene, 35/35/30 wt. ratio* | — | — | 100 | — | 100 |
| Carbon black, MT | 30 | 30 | 30 | 30 | 30 |
| Calcium hydroxide | 4.5 | 4.5 | 4.5 | 4.5 | 4.5 |
| Magnesium oxide | 3.0 | 3.0 | 3.0 | 3.0 | 3.0 |
| 4,4'-hexfluoroisopropylidene diphenol | 1.90 | 1.90 | 2.00 | 1.90 | 2.30 |
| Tetrabutylammonium hydrogen sulfate | 1.00 | 0.67 | 0.86 | — | — |
| Benzyltriphenylphosphonium choride | — | — | — | 1.00 | 1.03 |
| Mooney Scorch (121° C./30 min.) | | | | | |
| minimum (Mooney units) | 49 | 54 | 48 | 72 | 62 |
| time to 10 point rise, min | >30 | 15 | >30 | >30 | 8 |
| Oscillating Disk Rheometer | | | | | |
| ASTM D-2084, $M_H-M_L$, N · m | 4.7 | 5.3 | 3.9 | 4.6 | 3.8 |
| $t_s$ 0.2, min | 2.8 | 2.9 | 4.5 | 2.5 | 4.2 |
| $t_c$ 90, min | 3.8 | 4.3 | 6.7 | 4.2 | 8.9 |
| Press Cured Samples (177° C./10') | | | | | |
| Modulus - 100%, MPa | 4.7 | 5.1 | 4.2 | 4.0 | 4.4 |
| Tensile Strength, MPa | 11.3 | 12.1 | 11.3 | 10.2 | 10.0 |
| Elongation at break, % | 230 | 225 | 280 | 280 | 320 |
| Post Cured Samples (232° C./24 h) | | | | | |
| Modulus - 100%, MPa | 6.7 | 7.0 | 5.4 | 6.1 | 5.7 |
| Tensile Strength, MPa | 14.7 | 15.2 | 14.4 | 13.3 | 14.8 |
| Elongation at break, % | 180 | 170 | 210 | 187 | 255 |
| Heat Aged Samples (275° C./70 h air) | | | | | |
| Modulus - 100%, MPa | 4.0 | 3.7 | 3.0 | 3.7 | 3.5 |
| Tensile Strength, MPa | 10.4 | 11.2 | 8.9 | 10.4 | 7.2 |
| Elongation at break, % | 240 | 245 | 345 | 280 | 430 |
| Compression set, ASTM D-395-61, Method B 70 h/200° C. | 30 | 23 | 38 | 28 | 50 |
| Deposits in Mold After 50 Cycles | none | none | none | heavy | heavy |

*This polymer also contains a small amount of a bromine-containing fluorinated monomer, the amount being such as to provide 0.2 to 0.7 wt. % bromine in the gum as a cure site for possible alternative crosslinking with a peroxide (see U.S. Pat. No. 4,035,565, Apotheker et. al. and U.S. Pat. No. 4,263,414, West).

TABLE 3

| Example | Example 6 | Comp. Example 4 | Comp. Example 5 | Comp. Example 6 |
|---|---|---|---|---|
| Composition | | | | |
| vinylidene fluoride/hexafluoropropylene tetrafluoroethylene, 45/30/25 wt. ratio | 100 | 100 | 100 | 100 |
| Carbon black, MT | 30 | 30 | 30 | 30 |
| Calcium hydroxide | 6.0 | 4.5 | 4.5 | 4.5 |
| Magnesium oxide | 3.0 | 3.0 | 3.0 | 3.0 |
| 4,4'-hexfluoroisopropylidene diphenol | 1.9 | 1.9 | 1.9 | 1.9 |
| Tetrabutylammonium fluoride trihydrate | 0.62 | — | — | — |

TABLE 3-continued

| Example | Example 6 | Comp. Example 4 | Comp. Example 5 | Comp. Example 6 |
|---|---|---|---|---|
| Tetrabutylammonium iodide | — | 0.73 | — | — |
| Tetrabutylammonium bromide | — | — | 0.65 | — |
| Tetrabutylammonium chloride | — | — | — | 0.55 |
| Mooney Scorch (121° C./30 min.) | | | | |
| minimum (Mooney units) | 51 | 76 | 75 | 65 |
| time to 10 point rise, min | >30 | >30 | >30 | 10 |
| Cure state at 177° C./10 min | | | | |
| ASTM D-2084, $M_H$-$M_L$, N · m | 4.8 | 5.3 | 5.2 | 5.2 |
| $t_s$ 0.2, min | 3.3 | 4.6 | 4.0 | 2.8 |
| $t_c$ 90, min | 5.2 | 12.9 | 7.8 | 4.6 |
| Press Cured Samples (177° C./30') | | | | |
| Modulus - 100%, MPa | 4.5 | 4.3 | 4.6 | 4.7 |
| Tensile Strength, MPa | 9.2 | 9.5 | 10.1 | 10.3 |
| Elongation at break, % | 200 | 255 | 215 | 230 |
| Post Cured Samples (232° C./24 h) | | | | |
| Modulus - 100%, MPa | 6.2 | 6.1 | 7.0 | 6.5 |
| Tensile Strength, MPa | 11.1 | 17.3 | 15.8 | 13.2 |
| Elongation at break, % | 151 | 210 | 195 | 170 |
| Heat Aged Samples (275° C./70 h air) | | | | |
| Modulus - 100%, MPa | 3.0 | 3.5 | 3.8 | 4.0 |
| Tensile Strength, MPa | 9.6 | 12.1 | 10.0 | 11.3 |
| Elongation at break, % | 275 | 290 | 245 | 255 |
| Compression set B, % 70 h/200° C./70 h | 26 | 37 | 35 | 36 |
| Deposits in Mold After 50 Cycles | none | heavy | heavy | heavy |

TABLE 4

| Example | Example 7 | Example 8 | Example 9 |
|---|---|---|---|
| Composition | | | |
| vinylidene fluoride/hexafluoropropylene/tetrafluoroethylene, 45/30/25 wt. ratio | 100 | 100 | 100 |
| Carbon black, MT | 30 | 30 | 30 |
| Calcium hydroxide | 6.0 | 6.0 | 4.5 |
| Magnesium oxide | 3.0 | 3.0 | 3.0 |
| 4,4'-hexfluoroisopropylidene diphenol | 2.0 | 2.0 | 1.9 |
| Tetraethylammonium hydrogen sulfate | 0.30 | — | — |
| Tetrabutylammonium hydrogen sulfate | — | 0.59 | — |
| Tetrabutylammonium dihydrogen phosphate | — | — | 0.67 |
| Mooney Scorch (121° C./30 min.) | | | |
| minimum (Mooney units) | 61 | 56 | 56 |
| time to 10 point rise, min | >30 | 15 | 8 |
| Oscillating Disk Rheometer | | | |
| ASTM D-2084, $M_H$-$M_L$, N · m | 4.7 | 5.4 | 5.2 |
| $t_s$ 0.2, min | 5.0 | 3.7 | 2.9 |
| $t_c$ 90, min | 10.7 | 6.1 | 4.2 |
| Press Cured Samples (177° C./10') | | | |
| Modulus - 100%, MPa | 4.6 | 5.4 | 5.1 |
| Tensile Strength, MPa | 11.6 | 11.7 | 11.4 |
| Elongation at break, % | 235 | 220 | 215 |
| Compression set, ASTM D-395-61, Method B 70 h/200° C. | 32 | 27 | 21 |
| Deposits in Mold After 50 Cycles | none | none | none |

TABLE 5

| Example | Example 10 | Example 11 | Example 12 | Example 13 |
|---|---|---|---|---|
| Accelerator (parts by weight) | | | | |
| tetrabutylammonium acetate | 0.60 | — | — | — |
| tetrabutylammonium methane sulfonate | — | 0.67 | — | — |
| tetrabutylammonium toluene sulfonate | — | — | 0.82 | — |
| tetrabutylammonium periodate | — | — | — | 0.67 |
| Mooney Scorch (121° C./30 min) | | | | |
| minimum (Mooney units) | 56 | 63 | 59 | 50 |
| time to 10 point rise, min. | 30 | 10 | 30 | 30 |
| Oscillating Disk Rheometer | | | | |
| ASTM d-2084, $M_H$-$M_L$, N · m | 4.6 | 4.9 | 5.1 | 4.3 |
| $t_s$ 0.2, min. | 3.0 | 2.6 | 4.6 | 3.3 |
| $t_c$ 90, min. | 4.7 | 4.4 | 9.3 | 5.6 |
| Press Cured Samples (177° C./10 min) | | | | |
| Modulus - 100%, MPa | 4.7 | 5.0 | 4.7 | 4.3 |
| Tensile Strength, MPa | 9.6 | 9.9 | 10.4 | 10.1 |
| Elongation at Break, % | 200 | 215 | 230 | 215 |
| Deposits in Mold after 50 Cycles | None | None | None | None |

TABLE 6

| Example | 14 | 15 | 16 | 17 | 18 | 19 | 20 |
|---|---|---|---|---|---|---|---|
| Composition | | | | | | | |
| Elastomer | | | | | | | |

TABLE 6-continued

| Example | 14 | 15 | 16 | 17 | 18 | 19 | 20 |
|---|---|---|---|---|---|---|---|
| $CH_2=CF_2/CF_3CH=CF_2$, 60/40 wt. % | 100 | — | — | — | — | — | — |
| $CH_2=CF_2/CF_3CF=CF_2/CF_2=CF_2$, 45/30/25 WT. % | — | 100 | 100 | 100 | — | — | — |
| $CH_2=CF_2/CF_3CF=CF_2/CF_2=CF_2$, 35/35/30 WT. %* | — | — | — | — | 100 | 100 | 100 |
| Carbon black, MT | 30 | 30 | 30 | 30 | 30 | 30 | 30 |
| Calcium hydroxide | 2.0 | 4.5 | 2.0 | 2.5 | 4.5 | 4.5 | 3.0 |
| Magnesium oxide | 2.0 | 3.0 | 2.0 | 2.0 | 3.0 | 3.0 | 3.0 |
| Hydroquinone | 1.00 | — | 1.00 | — | 1.30 | — | — |
| 4,4'-Isopropylidene diphenol | — | 2.00 | — | — | — | — | — |
| 2,4-Dihydroxybenzophenone | — | — | — | 1.30 | — | — | 1.90 |
| Methylhydroquinone | — | — | — | — | — | 1.4 | — |
| Tetrabutylammonium hydrogen sulfate | .41 | .67 | .67 | .87 | .87 | .87 | 1.08 |
| Mooney Scorch (121° C./30 min.) | | | | | | | |
| minimum (Mooney units) | 27 | 53 | 50 | 47 | 67 | 62 | 52 |
| time to 10 point rise, min | 30 | >30 | >30 | >30 | 15 | >30 | >30 |
| Cure state at 177° C./30 min | | | | | | | |
| ASTM D-2084, $M_H-M_L$, N·m | 5.6 | 5.3 | 5.0 | 4.5 | 4.5 | 4.6 | 4.6 |
| $t_s$ 0.2, min | 2.0 | 3.0 | 3.0 | 2.4 | 3.2 | 2.8 | 2.6 |
| $t_c$ 90, min | 4.6 | 8.2 | 8.2 | 3.7 | 10.4 | 9.9 | 5.4 |
| Press Cured Samples (177° C./10') | | | | | | | |
| Modulus - 100%, MPa | 5.2 | 5.1 | 3.9 | 3.1 | 5.3 | 5.6 | 4.7 |
| Tensile Strength, MPa | 8.6 | 11.6 | 10.8 | 10.1 | 11.7 | 11.4 | 10.3 |
| Elongation at break, % | 150 | 250 | 300 | 335 | 255 | 255 | 300 |
| Post Cured Samples (232°0 C./24 h) | | | | | | | |
| Modulus - 100%, MPa | 7.2 | 7.0 | 5.7 | 4.1 | 7.9 | 7.2 | 5.2 |
| Tensile Strength, MPa | 10.8 | 13.0 | 13.6 | 12.8 | 9.7 | 14.8 | 11.0 |
| Elongation at break, % | 130 | 155 | 180 | 240 | 160 | 180 | 220 |
| Mold Deposits After 50 Cycles | Trace | None | Trace | None | None | None | None |

*This polymer also contains a small amount of a bromine-containing fluorinated monomer, the amount being such as to provide 0.2 to 0.7 wt. % bromine in the gum as a cure site for possible alternative crosslinking with a peroxide (see U.S. Pat. No. 4,035,565, Apotheker et. al. and U.S. Pat. No. 4,263,414, West).

We claim:

1. A fluoroelastomer composition that exhibits low tendency to foul mold cavities which comprises:
   (a) a fluoroelastomer comprising vinylidene fluoride units and units of at least one other fluorine-containing monomer copolymerizable with vinylidene fluoride, said monomer containing 2-7 carbon atoms and containing at least as many fluorine atoms as carbon atoms;
   (b) a crosslinking agent selected from the group consisting of a bisphenol or a polyhydroxy phenol of the formula:

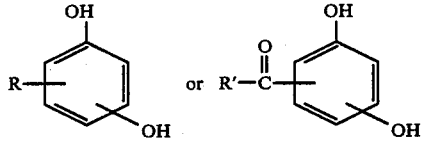

wherein R is H, or an alkyl group or aryl group and R' is an alkyl group or an aryl group,
   (c) a divalent metal oxide or hydroxide as an acid acceptor;
   (d) 0.2-4 parts by weight per 100 parts by weight fluoroelastomer of a crosslinking accelerator which is a quaternary ammonium salt of the formula $R''_4N^+X^-$ wherein each R" is independently an alkyl group of 2-4 carbon atoms and $X^-$ is selected from the group consisting of fluoride, dihydrogen phosphate, periodate, acetate, hydrogen sulfate, methane sulfonate, toluene sulfonate, or an anion of a bisphenol or a polyhydroxy phenol of (b) above.

2. A fluoroelastomer composition of claim 1 wherein $R''_4N^+X^-$ is tetraalkylammonium hydrogen sulfate.

3. A fluoroelastomer composition of claim 1 wherein $R''_4N^+X^-$ is tetraalkylammonium dihydrogen phosphate.

4. A fluoroelastomer composition of claim 1 wherein $R''_4N^+X^-$ is tetraalkylammonium fluoride.

5. A fluoroelastomer composition of claim 1 wherein $R''_4N^+X^-$ is tetraalkylammonium periodate.

6. A fluoroelastomer composition of claim 1 wherein $R''_4N^+X^-$ is tetraalkylammonium acetate.

7. A fluoroelastomer composition of claim 1 wherein $R''_4N^+X^-$ is tetraalkylammonium toluene sulfonate.

8. A fluoroelastomer composition of claim 1 wherein $R''_4N^+X^-$ is a tetraalkylammonium methane sulfonate.

9. A fluoroelastomer composition of claim 1 wherein $R''_4N^+X^-$ is a tetraalkylammonium salt of 4,4'-hexafluoroisopropylidene diphenol.

10. A fluoroelastomer composition of claim 1 wherein each R" is an alkyl group of 4 carbon atoms.

11. A fluoroelastomer composition of claim 1 wherein R" is n-butyl.

12. A fluoroelastomer composition of claim 1 wherein the divalent metal oxide or hydroxide is calcium or magnesium.

13. A fluoroelastomer composition of claim 1 wherein the curing agent is 4,4'-hexafluoroisopropylidene diphenol.

14. A fluoroelastomer composition of claim 1 wherein the curing agent is hydroquinone.

* * * * *